United States Patent [19]
Jensen

[11] Patent Number: 6,082,958
[45] Date of Patent: Jul. 4, 2000

[54] LIFT-TYPE LOADING PLATFORM SYSTEM

[75] Inventor: Jens Herman Jensen, Ulfborg, Denmark

[73] Assignee: Sorensen Hydraulik, Zweigniederlassung, Ulfborg, Filial AF Sorensen Hydraulik GmbH, Tyskland, Ulfborg, Denmark

[21] Appl. No.: 08/788,813

[22] Filed: Jan. 23, 1997

[30] Foreign Application Priority Data

May 21, 1996 [EP] European Pat. Off. .............. 96108052

[51] Int. Cl.[7] ...................................................... B60P 1/44
[52] U.S. Cl. .......................................... 414/557; 414/917
[58] Field of Search ..................... 414/557, 917

[56] References Cited

U.S. PATENT DOCUMENTS

| | | | |
|---|---|---|---|
| 2,792,135 | 5/1957 | Wood | 414/557 |
| 2,850,187 | 9/1958 | Roberts | 414/557 |
| 2,889,059 | 6/1959 | Selzer | 414/557 |
| 3,842,997 | 10/1974 | Sprikkelman | 414/557 |
| 3,883,014 | 5/1975 | Glomski et al. | 414/557 |
| 4,147,261 | 4/1979 | Dautel et al. | 414/557 |
| 5,588,793 | 12/1996 | Chang | 414/557 |

FOREIGN PATENT DOCUMENTS

| | | | |
|---|---|---|---|
| 2654286 | 6/1978 | Germany . | |
| 3228765 | 2/1984 | Germany . | |
| 641407 | 8/1950 | United Kingdom | 414/557 |

OTHER PUBLICATIONS

Brochure of Productions AB Hydro Lift of Tursälla, Sweden.

*Primary Examiner*—Thomas J. Brahan
*Attorney, Agent, or Firm*—Jacobson, Price, Holman & Stern, PLLC

[57] ABSTRACT

A lift-type loading platform system, which system can be mounted on a motor vehicle, particularly a truck, the system including a lifting and closing mechanism which has an essentially parallelogram configuration, which mechanism includes two supporting frames which are generally mutually parallel and spaced a distance apart, an essentially plate-like loading platform, intended for raising and lowering a load and for closing off a cargo compartment or backdraft space of the vehicle, a "lifting" cylinder mechanism for raising and lowering the platform, and a "closing" cylinder mechanism for swinging the loading platform back and forth from the horizontal to the vertical position. In the "lifting and closing mechanism", the force application points of the "lifting" cylinder mechanism lie in a plane including pivot points, respectively, of the elements of the first supporting frame via which elements the "lifting" cylinder mechanism associated with the first supporting frame exerts forces on the frame, and the force application points of the "closing" cylinder mechanism lie in a plane including the pivot points, respectively, of the elements of the second supporting frame via which elements the "closing" cylinder mechanism associated with the second supporting frame exerts forces on or from the frame.

17 Claims, 4 Drawing Sheets

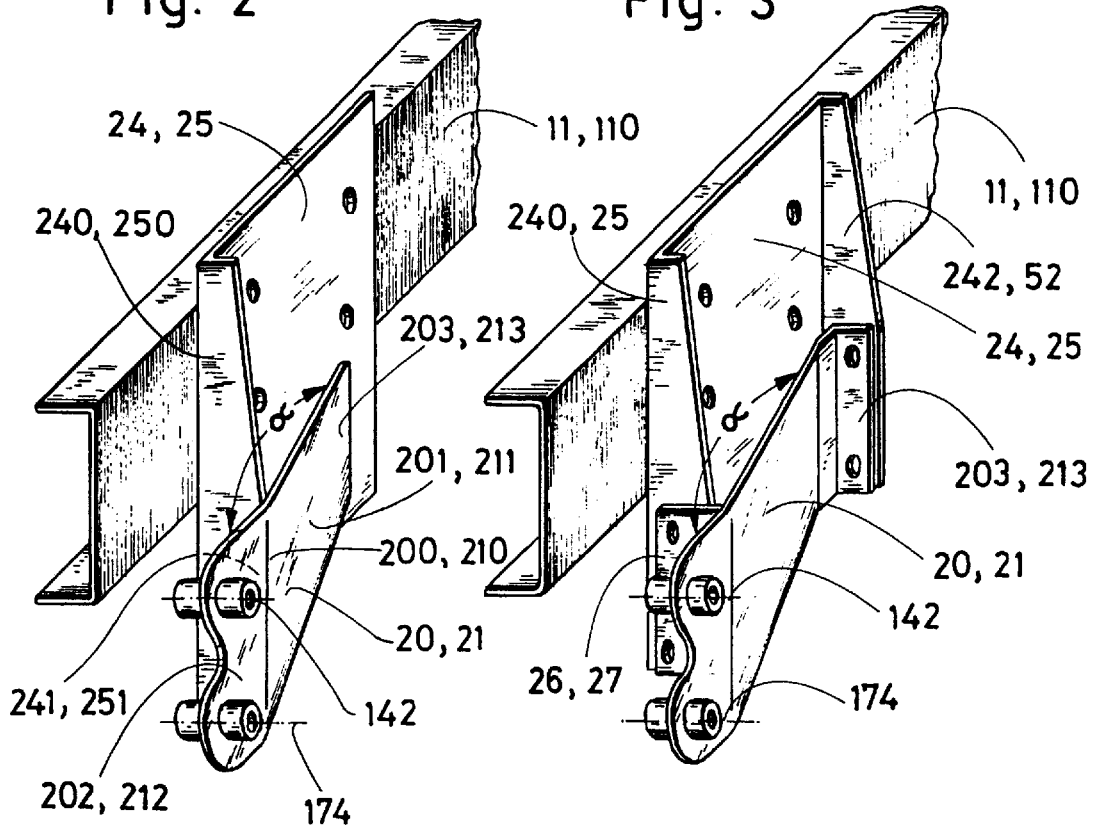

LIFT-TYPE LOADING PLATFORM SYSTEM

FIELD OF THE INVENTION

The invention relates to a lift-type loading platform system which can be mounted on a motor vehicle, particularly a truck, the system including a "lifting and closing mechanism" which has an essentially parallelogram configuration, which mechanism has two supporting frames which are generally mutually parallel and spaced a mutual distance apart, an essentially plate-like loading platform, intended for raising and lowering a load and for closing off a cargo compartment or backdraft space of the vehicle, a "lifting" cylinder mechanism for raising and lowering the platform, and a "closing" cylinder mechanism for swinging the loading platform back and forth from the horizontal to the vertical position.

BACKGROUND OF THE INVENTION

Loading platform systems of this type have long been known, and are used particularly on trucks, for unloading and loading at a loading station; in particular:

- to lower freight items from the truck bed to the roadway on which the truck is parked, from whence the freight items are transported to their destination by other means; and also
- to load freight items onto a truck, wherewith the item is deposited on the lift-type loading platform when the platform is disposed at the roadway level, following which the platform is raised to the level of the truck bed, and the freight item is then transferred from the platform to the truck bed. When the process (loading or unloading) is completed, the loading platform is swung from the horizontal orientation to a vertical orientation, where it can serve to close off the truck bed and the generally box-shaped cargo compartment of the truck.

A so-called "lifting cylinder mechanism" is used to raise and lower the loading platform while maintaining the platform in an essentially horizontal orientation, for loading and unloading to and from the truck bed. Such a "lifting" cylinder mechanism may be powered by hydraulic cylinder or other means. A "closing cylinder mechanism", powered by hydraulic cylinder or other means, is employed to swing the loading platform back and forth between a horizontal orientation and a vertical orientation. Known types of systems for loading platforms, as described supra, thus have two cylinder mechanisms, one of which, the "lifting" cylinder mechanism, typically interacts with one of the supporting frames which are components of the combined, parallelogram-configured "lifting and closing" mechanism, and the other, the "closing" cylinder mechanism, typically interacts with the other supporting frame which is a component of said "lifting and closing" mechanism.

In known loading platform systems of the type described supra, in loading and unloading, when forces are exerted which may be substantial in the case of heavy loads, problems can arise if the load carried on the loading platform causes the loading platform to bend (or deflect) with respect to the (flat) load bed of the truck, resulting in both horizontal and vertical gaps between the loading platform and the truck bed; and the magnitude of such gaps may vary substantially in relation to the width of the cargo compartment opening. The result is that, in particular for a heavy load which must be transported vertically with the loading platform oriented in a horizontal position, i.e. during raising and lowering, the distortions and misalignments which occur can be tantamount to barriers between the plane of the loading platform and the load bed of the truck. To overcome the barrier, the load must be lifted by supplementary means (manually, or with a dolly, hand truck, or other means).

This expedient is hazardous to the goods being loaded, which may be damaged when they are tilted to facilitate the crossing of the barrier between the mounting loading platform and the truck bed; moreover, the personnel performing these maneuvers are at substantial risk of injury, e.g. serious compression injuries of extremities (feet and hands).

The horizontal and vertical gaps, which on one side may even be greater than the depth of the loading platform itself (in the longitudinal direction of the vehicle), arise from the fact that the "lifting" cylinder mechanism and the "closing" cylinder mechanism are both disposed at lateral distances from the "supporting frames" of which the "lifting and closing mechanism" is comprised, i.e. they are oriented perpendicularly to the opening of the truck cargo compartment of the truck bed and perpendicularly to the loading platform. This arrangement allows substantially leveraged forces to develop, under load conditions; and these forces result in the development of the aforementioned horizontal and vertical gaps under the load conditions.

An approach to a solution of this serious problem for conditions of moderate stress on the loading platform during raising and lowering of freight items has been to provide a structure in which the first and second supporting frames, which form the "lifting and closing mechanism", are spaced apart and are inclined at an angle with respect to each other, such that when the expected moderate freight load is present and being raised or lowered by the loading platform system, the "lifting and closing mechanism" yields flexurally in combination with the loading platform in a manner which compensates for the tendency to deform and misalign, with the result being that ultimately the loading platform is aligned flush with the plane of the truck bed. However, such a result is achieved only when the freight load borne is precisely that expected load for which the described ad hoc solution was designed. Moreover, the known solution has the disadvantage that when the loading platform no longer bears a freight load but is swung up into its vertical "closing" position in which it closes off the truck cargo compartment, it is not properly aligned to perform that closure, but rather a gap is present between the vertically oriented loading platform and the loading opening of the cargo compartment of the truck, which gap widens on both sides, due to a rearward angular sweep of the no longer planar loading platform. Another important disadvantage of the known solution is that if the loading platform is loaded with freight wherewith the applied stress from the load exceeds a specified stress value and the applied stress is less than the design stress, undesirable gaps between the truck bed and the plane of the loading platform again develop, with the above-described undesirable consequences.

SUMMARY OF THE INVENTION

Accordingly, the underlying problem of the present invention is to devise a loading platform system of the type described initially supra, which system does not have the above-described disadvantages. In particular, independently of the load to be borne on the loading platform during loading and unloading, no gaps in the vertical or horizontal direction will appear between said platform and the load bed of a vehicle, during the loading or unloading process; when the loading platform is in the upswung vertical ("closed") state, no gap will appear between said platform and the opening of the cargo compartment of the vehicle; the described system has a simple structure, is easy and inexpensive to fabricate, and provides a stable and safe means of raising and lowering a load disposed on the loading platform; and the system provides for safe and reliable closing of the cargo compartment of a vehicle.

This problem is solved according to the invention in that, in the "lifting and closing mechanism", regarding the first supporting frame and the "lifting" cylinder mechanism: the force application points of the "lifting" cylinder mechanism lie in a plane passing through the pivot points ($A_1$, $C_1$, D, $E_1$), respectively, of the elements of the first supporting frame, via which elements of the "lifting" cylinder mechanism (associated with the first supporting frame) exert forces on the frame, and regarding the second supporting frame and the "closing" cylinder mechanism: the force application points of the "closing" cylinder mechanism lie in a plane passing through the pivot points ($A_2$, B, $C_2$, $E_2$), respectively, of the elements of the second supporting frame, via which elements the "closing" cylinder mechanism (associated with the second supporting frame) exerts forces on or from the frame.

The advantage of the solution proposed according to the invention is essentially that, due to the configuration of the two generally parallelogram-configured supporting frames, which frames together form the "lifting and closing mechanism", and the configuration of the "lifting" cylinder mechanism and "closing" cylinder mechanism, disposed in the respective swing planes of the respective said supporting frames, in particular, the fact that the "lifting" cylinder mechanism is not disposed at a lateral displacement from the swing plane of its associated supporting frame, and the fact that the "closing" cylinder mechanism is not disposed at a lateral displacement from the swing plane of its associated supporting frame, no force moments can develop in the transverse direction i.e. where the moment arm of the forces is transversely directed to the longitudinal direction of the vehicle (e.g. moment arm in direction of axis 137 in FIG. 6). This assures that, when the loading platform is in the horizontal orientation, no gaps in the vertical or horizontal direction can develop between the loading platform and the load bed of the vehicle; and, when the loading platform is in the vertical orientation in which it closes off the cargo compartment of the vehicle, no "self-widening" gaps can develop.

Other important advantages of the inventive loading platform system are that the system is easy to fabricate, and that by its construction it provides for uniform stress on the "lifting and closing mechanism", so that the mechanism remains stable over long periods, with required maintenance being reduced to a minimum.

A critical advantage is that it is not necessary to employ any axles per se; experience having shown that such structures have major drawbacks.

According to an advantageous embodiment of the loading platform system of the present invention, the first supporting frame is comprised of two frame members of a first type which are essentially mutually parallel and are separated by a distance, wherewith the first frame members are swingably mounted to the vehicle via a first swing pivot means, and the first frame members are pivotably connected to the first end of the "lifting" cylinder mechanism via a second swing pivot means, at the opposite end of the frame members of the first type, wherewith the second end of the "lifting" cylinder mechanism is (also pivotably) connected to the vehicle via a swing axis means. Whereas it is fundamentally possible for the first supporting frame to have a different configuration than described, the described configuration has the advantages that it is simple, easy to fabricate, and satisfies the requirement that the swing pivot points of the elements of the first supporting frame and the "lifting" cylinder mechanism lie in a single plane. Thus this advantageous embodiment provides a configurational solution which is easy to realize and very stable.

According to another advantageous embodiment of the loading platform system of the present invention, the first supporting frame is comprised of a frame member of the second type attached at its first end to the two frame members of the first type, wherewith the second end of the frame member of the second type is pivotably connected to the loading platform via swing pivot means disposed on the second end and oriented essentially perpendicularly to the two frame members of the first type. Whereas fundamentally the details of the configuration of the frame member of the second type are somewhat arbitrary, the described inventive configuration has the advantages that it is simple, easy to fabricate, and satisfies the requirement that the swing pivot points of the elements of the first supporting frame (in which supporting frame the "lifting" cylinder mechanism is disposed) lie in a single plane.

It is advantageous that the frame member of the second type is disposed essentially in the midplane between the two frame members of the first type. This results in a simple and economical configuration, with the frame member of the second type being integrated into the first supporting frame in advantageous fashion.

According to yet another advantageous embodiment of the loading platform system, the second supporting frame is comprised of two frame members of a first type which are essentially mutually parallel and are separated by a distance, wherewith the frame members of the first type are swingably mounted to the vehicle via a first swing pivot means, and the frame members of the first type are pivotably connected to the loading platform via a second swing pivot means disposed on the opposite end of the frame members of the first type and oriented essentially perpendicularly to the frame members and parallel to the first swing pivot means. As discussed in connection with the first supporting frame, here the second supporting frame as well has the advantages of simple structure and satisfaction, by simple means, of the requirement that the swing pivot points of the elements of the second supporting frame, in which frame the "closing" cylinder mechanism is also disposed as a part of the parallelogram of the second supporting frame, lie in a single swing plane. Whereas, fundamentally, other configurations are possible which satisfy the above-recited basic requirements for the inventively proposed solution, the advantageous solution proposed here is simple, relatively easy and economical to produce, and very stable.

Finally, an advantageous embodiment of the inventive loading platform system may be produced in which the first end of the "closing" cylinder mechanism is pivotably (swingably) connected to the vehicle, and the second end of the "closing" cylinder mechanism is pivotably connected to the loading platform via a swing pivot means with a pivot axis essentially perpendicular to the longitudinal axis of the "closing" cylinder mechanism, wherewith the longitudinal axis is essentially disposed in the plane in which the second supporting frame executes swinging movements. Fundamentally, other configurations are possible which satisfy the basic condition that the swing pivot points of the elements of the second supporting frame, in which frame the "closing" cylinder mechanism is also a component, lie in a single swing plane. However, here again, the chosen configuration of the second supporting frame in the advantageous embodiment described satisfies the requirement and at the same time has a particularly simple structure and is easy to fabricate.

The actual structural form chosen for the "frame members" may vary substantially. For example, the frame members may comprise molded pieces, e.g. of cast steel or the like. However, it has been found to be advantageous if the frame members have a generally plate-like shape; thus they may be fabricated from semifinished products in plate form, e.g. steel plate, or other suitable materials in plate form. An easy and economical fabrication method comprises cutting or stamping of the frame members from plate material. This method may be used for the frame member of the second type (in the first supporting frame) as well as the frame members of the first type.

The inventive loading platform system may be attached to a suitable load-bearing structure of a vehicle by any suitable means. A typical load-bearing structure of a vehicle is comprised of two parallel U-profile beams extending in the longitudinal direction of the vehicle, which beams are mutually parallel and spaced a distance apart. The drive shaft(s) of the vehicle may be accommodated in or between the beams. Often, loading platform systems of the general type described will be mounted directly to the beams, by screw- and/or weld connections, or more costly mounting means.

In order to provide simple, economical means of attaching the loading platform system, thereby allowing the system to be mounted as an aftermarket accessory, or to be demounted as desired, advantageously the first and second supporting frames for the loading platform are mounted on the vehicle by means of respective mounting fixtures, wherewith each such mounting fixture is a component of its associated (first or second) supporting frame having planar a parallelogram configuration. Thus no separate mounting fixtures per se are required. The described integrated mounting fixtures provide means of easily and quickly mounting the loading platform system to the vehicle frame.

The variety of possible structures of suitable mounting fixtures is large. However, it has been found advantageous if the mounting fixtures are comprised of plate-like pieces. These provide the advantage of being easy to fabricate, e.g. by stamping or cutting the pieces out of semifinished stock in plate form.

In order to provide means of easily fortifying the flexural stiffness of the mounting fixtures, and to reduce the transmission of forces i.e. undesirable influences derived from the loading platform system and the freight load carried thereon, into the vehicle frame and thus into the vehicle, the mounting fixture has a bend line which is essentially vertical when the fixture is mounted on the vehicle, which bend line defines a first part of the mounting fixture, which first part extends toward the vehicle frame member on the vehicle, and a second part of the mounting fixture by which part the mounting fixture is fixed to the respective "supporting frame" of the inventive "lifting and closing mechanism", wherewith the second part is oriented generally parallel to the vehicle frame member, and wherewith an obtuse angle a is formed between the two parts of the mounting fixture.

Preferably, the mounting fixture can be fixed to the vehicle frame member(s) of a vehicle by means of a special fixing element (e.g. a bracket or other adaptor) which element can be fabricated to adapt to the structure of said vehicle frame member(s). This arrangement enables the remainder of the loading platform system to have a standardized construction, wherewith the only element of the system which may need to be adapted to the peculiarities of the vehicle frame of the vehicle on which the system is to be mounted is the special fixing element.

The special fixing element (bracket or the like) preferably has a plate-like structure, which enables it to be easily fabricated, e.g. by stamping from semifinished plate materials.

In order to optimize the strength of the "special fixing element", particularly its flexural strength, without resorting to a complex structure, the fixing element has at least one first leg which projects essentially transversely with respect to the vehicle, wherewith the above mentioned "mounting fixture" is connected at least to the free end of the first leg(s), in the region of the bend line of the "mounting fixture". Whereas the "mounting fixture" can be easily attached to the "special fixing element" by welding in the region of the bend line, it is also possible to provide an angle bracket (angle profile piece) in the region, wherewith one leg of the angle bracket can be fastened to the second part of the "mounting fixture" and also the other leg of the angle bracket can be fastened to the first leg of the "special fixing element", using welds or screw means. Such an angle bracket improves the flexural strength and general stability of the connection between the mounting fixture and the special fixing element.

According to another advantageous configuration, which has improved robustness and stability and thereby enables transmission of more substantial forces through the loading platform system and the freight load carried thereon to the vehicle frame, the "special fixing element" (bracket or the like) has a leg of a second type (second leg), which is directed generally transversely to the vehicle, wherewith the free end of the "first part" of the "mounting fixture", which free end is bent outward, is connected to the second leg of the "special fixing element". This arrangement, in combination with the above-described angle bracket. installed between the "special fixing element" and the "mounting fixture", serves to conveniently adapt the installation of the loading platform system to pairs of laterally separated vehicle frame members which vehicle frame members have different mutual separations. This is accomplished in that the angle bracket may be attached to the first leg of the "special fixing element", and the outwardly bent free end of the first part of the "mounting fixture" may be attached to the second leg of the "special fixing element", at respective different distances from the base of the "special fixing element", depending on the mutual separation of the given vehicle frame members on which the system is being mounted.

As mentioned above, fixed fastening means, e.g. screw means and/or welding, may be used to mount the mounting fixture to the vehicle frame member via the described means employing the "special fixing element". However, in order to provide a freer range of adjustment possibilities, and to avoid having to exactly determine the optimum mounting points prior to the actual mounting process, and/or to avoid the often undesirable expedient of drilling mounting holes in, or performing welds on, the vehicle frame members themselves (which may weaken the vehicle frame members), preferably the "mounting fixtures" are releasably fixed to the vehicle frame members of a vehicle by means of claw-like clamping elements which form-interlockingly engage the beams of which the vehicle frame members are comprised, the engagement being via (on or over) horizontal legs of the beams. This arrangement provides for easy attachment (and detachment), with high stability, reliability, and safety, of the attachment during the operation of the mounted loading platform system, and without the need to drill holes in the vehicle frame members or to stress them with welding operations. Thus the vehicle frame members bearing the mounted loading platform system do not have diminished stability.

BRIEF DESCRIPTION OF THE DRAWINGS

The invention will be described in more detail hereinbelow, on the basis of exemplary embodiments, with reference to the accompanying schematic drawings.

FIG. 2 is a perspective view of elements of a first mounting fixture which can be fixed to the vehicle frame by means of screws;

FIG. 3 is a perspective view of elements of a second mounting fixture which can be fixed to the vehicle frame by means of screws, which second fixture is intended for relatively high loads (compared to that of FIG. 2);

FIG. 4 is a perspective view of elements of the loading platform system of FIG. 1;

DETAILED DESCRIPTION OF THE PREFERRED EMBODIMENTS

Figure 1:
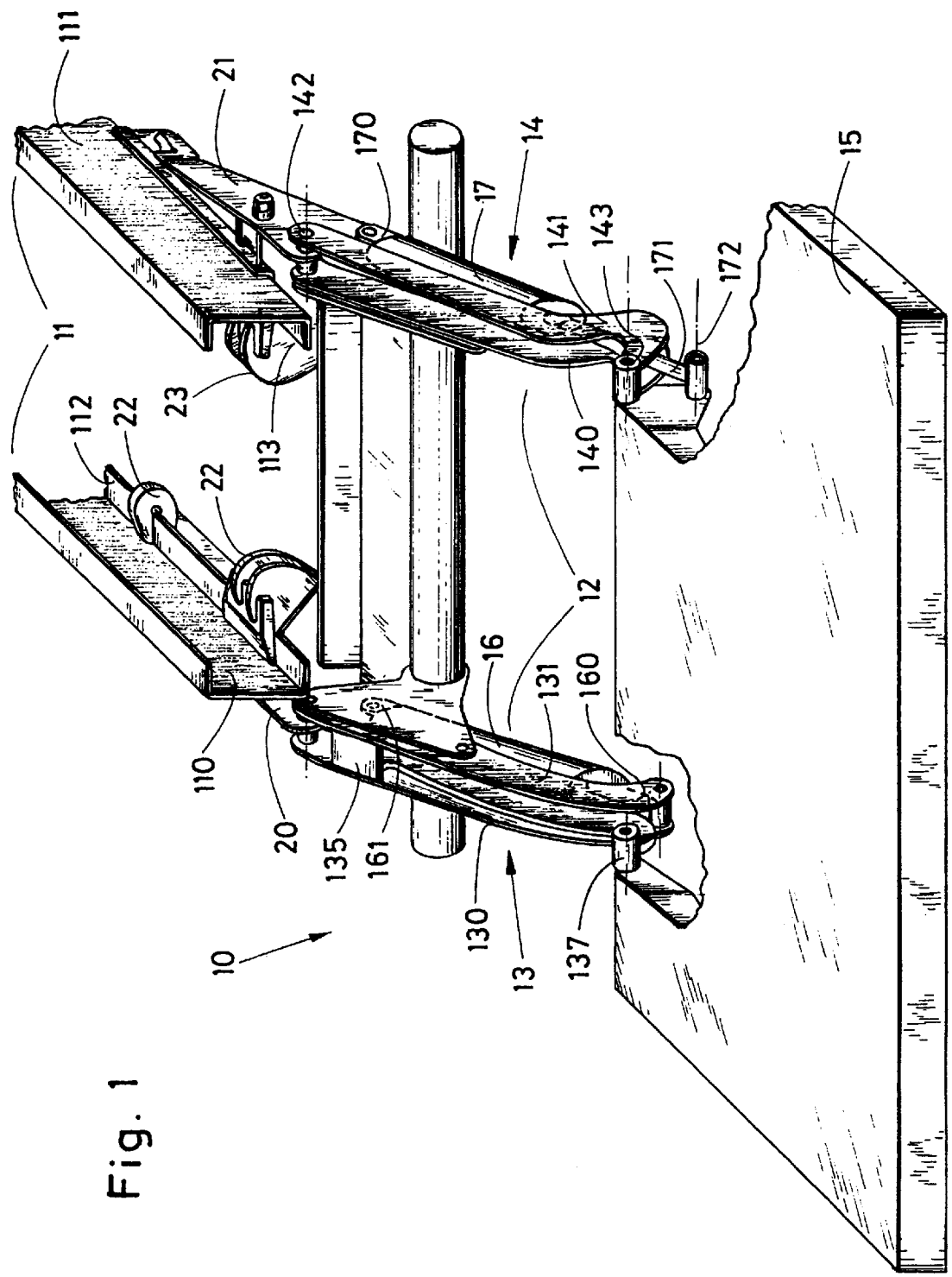
FIG. 1 is a perspective partial cutaway view of an inventive loading platform system which is mounted on horizontal leg members of beams of the load-bearing frame of a vehicle, by means of claw-like clamping elements, wherewith the platform is illustrated in the lowered position.

The basic structure of the loading platform system 10 (FIG. 1) will be described first. System 10 is comprised essentially of a "lifting and closing mechanism" 12 which has raising and lowering components in the form of a mechanism designated the "first supporting frame" 13, and up-swinging and down-swinging components in the form of a mechanism designated the "second supporting frame" 14, wherewith the "supporting frames" 13 and 14 are fixed to a vehicle 11 by mounting fixtures (20, 21), such that the mechanisms (13, 14) are mutually parallel and spaced a distance apart.

The mounting means will be discussed in more detail infra. Parallelogram structures are formed from the first and second supporting frames (13, 14) and the corresponding mounting fixtures (20, 21); a parallelogram structure is also formed from the second supporting frame 14 and the "closing cylinder mechanism" 17 (see FIG. 5). These structures will be discussed in more detail infra. An essentially flat loading platform 15, intended for raising and lowering a load (load not shown) and for closing off the cargo compartment or a backdraft space (not shown) of the vehicle 11, is swingably mounted on the first and second supporting frames (13, 14). A "lifting cylinder mechanism" 16 cooperates with the first supporting frame 13 to raise and lower the loading platform 15. The closing cylinder mechanism 17, which serves to swing the loading platform from a horizontal to a vertical position and vice versa, cooperates with the second supporting frame 14 and is part of the parallelogram structure associated with the second supporting frame 14.

Figure 5:
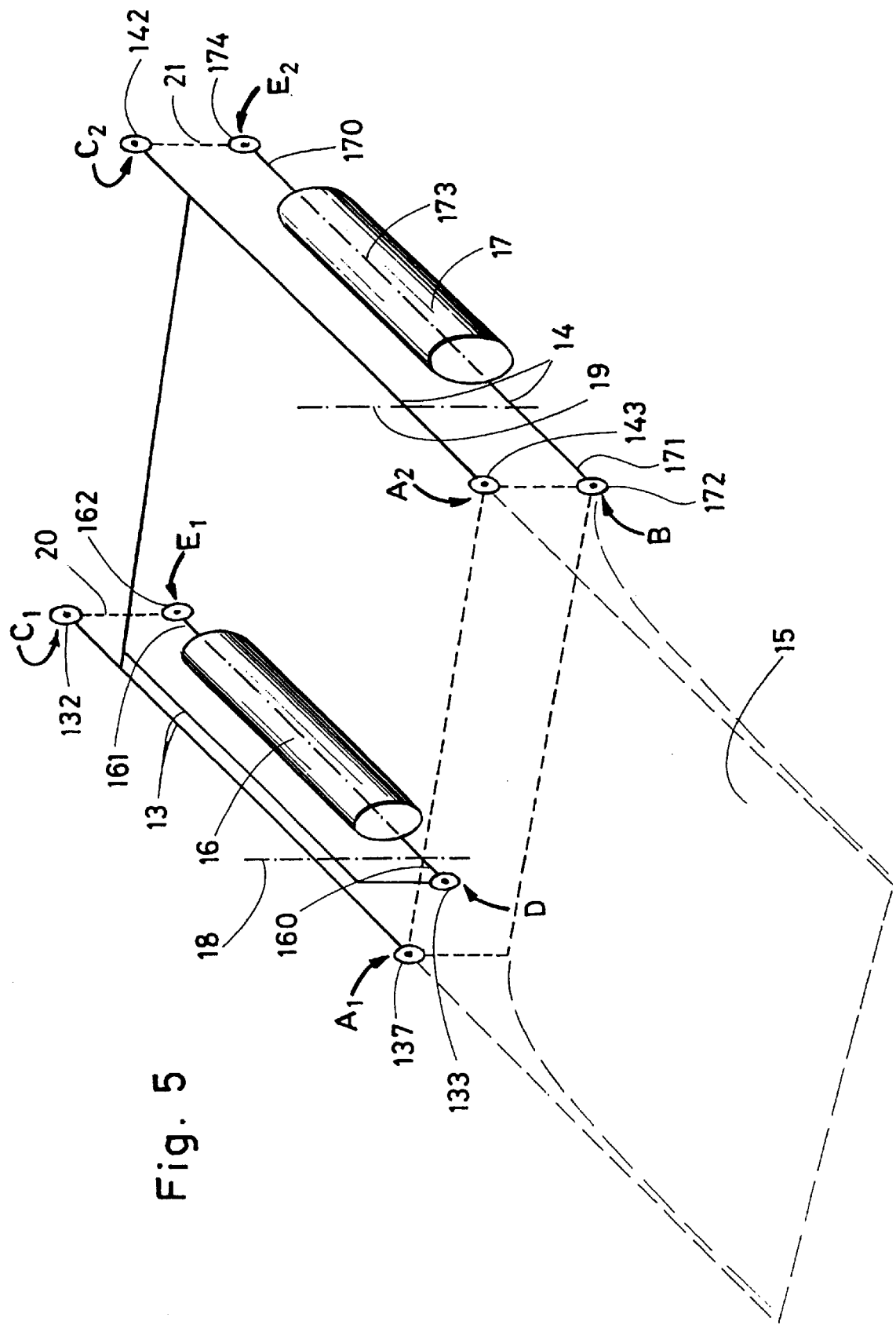
FIG. 5 is a schematic sketch showing basic components of the "first supporting frame" and "second supporting frame", the "lifting cylinder mechanism" which engages the supporting frames to raise and lower the loading platform, and the "closing cylinder mechanism" which swings the loading platform up and down to close off the cargo compartment (or a backdraft space) of the vehicle or open it up again.

The first supporting frame 13, shown on the left side in FIGS. 1 and 5, is comprised of two frame members of the first type (130, 131) which are essentially mutually parallel and are is separated by a distance. These members (130, 131) are swingably mounted to the mounting fixture 20 via swing pivot means 132. A second swing pivot means 133, at the opposite end of the frame members of the first type (130, 131), is connected to the first end 160 of the lifting cylinder mechanism 16 (see also FIG. 6). The second end 161 of the lifting cylinder mechanism 16 is (also pivotably) connected to the mounting fixture 20.

Figure 6:
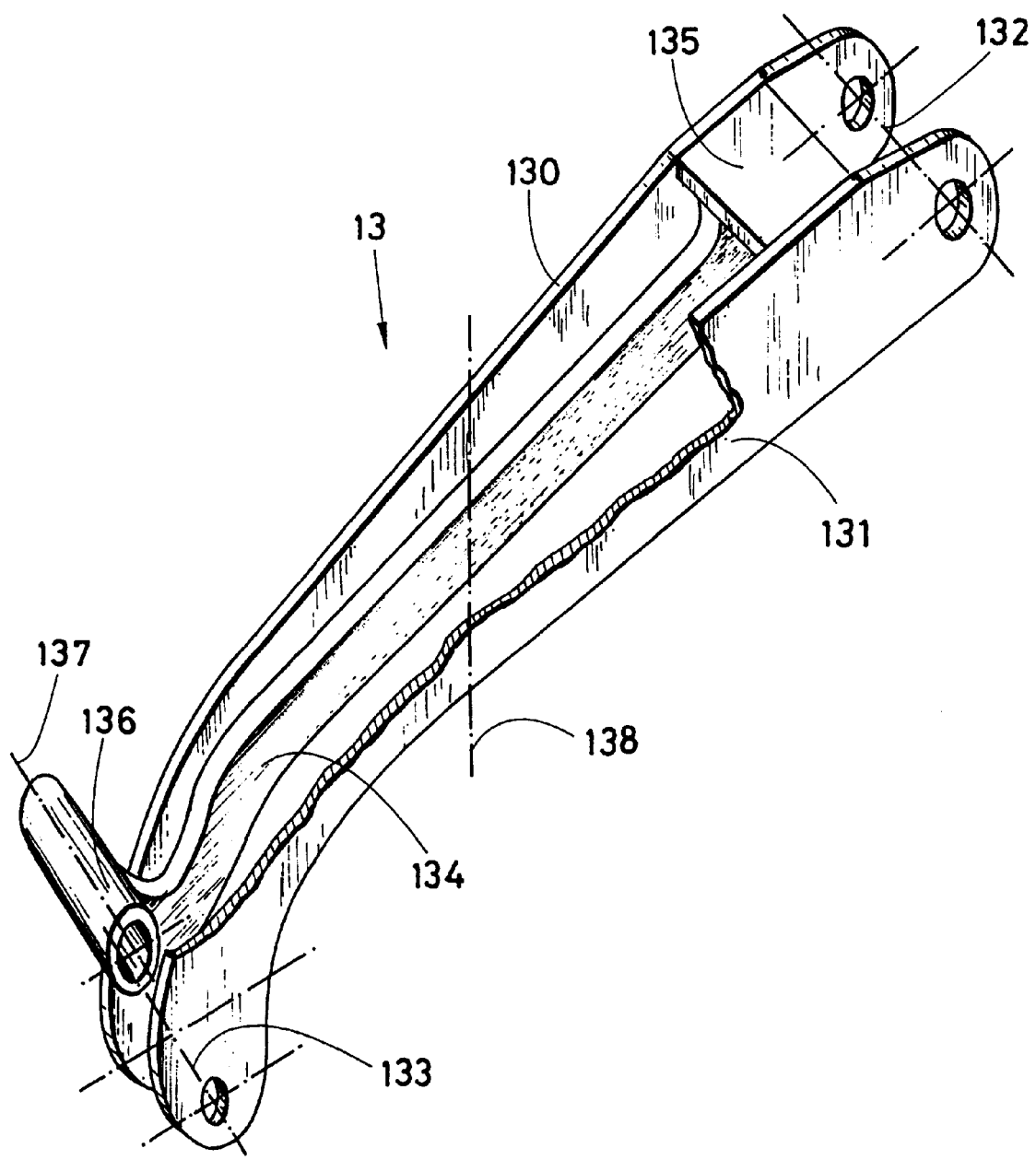
FIG. 6 is a perspective view of the "first supporting frame", comprised of two "frame members of the first type" and a "frame member of the second type", wherewith for better illustration of the structure of the "first supporting frame", the "frame member of the first type" has been partially cut away.

A different frame member 134, designated the "frame member of the second type", is disposed essentially in the central plane (midplane) between the frame members of the first type (130, 131) (FIG. 6). The first end 135 of frame member 134 is attached to the two frame members of the first type (130, 131) such that a bridge is formed between members 130 and 131. The second end 136 of frame member 134 is pivotably connected to the loading platform 15 at a pivot axis 137 which is essentially perpendicular to the two frame members of the first type (130, 131).

The second supporting frame 14, which has a similar structure to that of the first supporting frame 13, is comprised of two frame members (140, 141) which are essentially mutually parallel and are separated by a distance. These members (140, 141) are swingably mounted to the mounting fixture 21 at a first swing axis 142. The second swing axis 143, at the opposite end of said frame members (140, 141), is essentially perpendicular to the frame members (140, 141) and is parallel to the first swing axis 142. The two frame members (140, 141) are pivotably connected to the loading platform 15 at the second swing axis 143.

One "leg" of the generally parallelogram-shaped second supporting frame 14 is occupied by the "closing cylinder mechanism" 17 (see FIG. 5). The first end 170 of mechanism 17 is pivotably connected to the mounting fixture 21, at a pivot axis 174. The second end 171 of mechanism 17 is pivotably connected to the loading platform 15 at a pivot axis 172 which is essentially perpendicular to the longitudinal axis 173 of mechanism 17. Axis 173 is disposed in a plane passing through the line 19 (dot-dashed line in FIG. 5), which is the plane in which the second supporting frame 14 executes swinging movements.

FIG. 5 illustrates the lever arrangement of the (lifting and closing) supporting mechanism 12, which has a parallelogram configuration. The "lifting and closing" mechanism 12 is comprised of the first supporting frame 13, engaged by the "lifting cylinder mechanism" 16, and the second supporting frame 14, integrating the "closing cylinder mechanism" 17. In the lifting and closing mechanism 12, the force application points of the lifting cylinder mechanism 16 lie in a plane passing through the line 18 and including the pivot points ($A_1$, $C_1$, D, $E_1$), respectively, of the swing axes (137, 132, 133, 162) of the first supporting frame 13, and the force application points of the closing cylinder mechanism 17 lie in a plane passing through the line 19 and including the pivot points ($A_2$, B, $C_2$, $E_2$), respectively, of the swing axes (143, 172, 142, 174) of the second supporting frame 14.

Because of the structural design, wherein the force application points of the two supporting frames (13, 14) lie in the plane of the pivot points for the respective supporting frame (13, 14), undesirable torques cannot be exerted on the various elements of the system, in particular the loading platform 15 when a load is present on the loading platform 15; accordingly, one avoids formation of a (vertical and/or horizontal) gap between the horizontally disposed loading platform 15 and the load-bearing deck (e.g. truck bed) (not shown) of the vehicle 11 when the lifting and closing mechanism 12 is in the raised state. Such a gap will not form even when the loading platform 15 has been swung from its horizontal position into the vertical ("closed") position by actuating the "closing cylinder mechanism" 17.

The mounting fixtures (20, 21) also form part of the operating mechanism involving the parallelogram-configured supporting frames (13, 14) (see FIGS. 2, 3, and 4, as well as FIG. 5). These fixtures (20, 21) may be comprised of flat elements in the nature of metal plates, which can readily accommodate the bearing bushings for the pivots (132, 162, 142, 174). Screw means may be used to attach the fixtures (20, 21) to the frame members 110, 111 of the vehicle 11, illustrated in FIGS. 2 and 3, wherewith corresponding bores must be produced in the frames 110, 111 to accommodate the screw means (not shown).

The two variants of the mounting fixtures (20, 21) illustrated in FIGS. 2 and 3 have respective bend lines (200, 210) which are essentially vertical when the fixtures are mounted on the vehicle 11 (on the vehicle frame members (110, 111)). The thereby formed first part (201, 211) of the mounting fixture (20, 21) extends at an angle toward the respective vehicle frame member (110, 111) on vehicle 11, whereas the second part (202, 212) of the mounting fixture (20, 21) is fixed to the respective supporting frame (13, 14) of the "lifting and closing mechanism" 12 and is oriented generally parallel to the vehicle frame member (110, 111). Accordingly, an obtuse angle a is formed between the two parts (201, 202; 211, 212).

FIG. 2 shows a variant of the region in which the loading platform system is mounted to the vehicle frame member 110 of the vehicle 11. A bracket 24, 25 (also referred to hereinabove as a "special fixing element") having an L-shaped cross section is attached to the vehicle frame member 110 such that a first leg 240, 250 of the bracket 24 projects transversely from the frame member 110. The mounting fixture (201, 202, 20) is connected to the free end 241, 251 of the leg 240 in the region of the bend line 200, 210 of the fixture (201, 202, 20), e.g. by means of a weld seam (not shown) or a screw connection (also not shown); and the free end 203, 213 of the first part 201 of fixture 20 is connected to the plate-like base member of the bracket 24 by welding or other suitable means.

FIG. 3 shows another variant of the region in which the loading platform system 10 is mounted to the vehicle frame member of the vehicle 11. This variant is generally similar to that of FIG. 2. However, the variant of the bracket (24, 25) in FIG. 3 has a second leg (242, 52) which, like the first leg 250, projects transversely from the base of the bracket 25, and thus in the installed state projects transversely from the frame member 110. The free end 203, 213 of the mounting fixture 21 is bent outward with respect to the first part 201, 211 of fixture 21, and the outwardly bent member 213 is attached to the second leg 242, 52 of the bracket 25. (In comparison, the free end 203 of the first part 201 of the mounting fixture 20 in FIG. 2 lacks such an outward bend.)

An angle profile piece 26 may also be provided between, the second part 202, 212 of the mounting fixture 21 and the first leg of the bracket 25, wherewith the angle piece 26 may be fastened securely to the mounting fixture 21 by, e.g., welding or screw means. Throughgoing holes may be provided in the free leg of the angle profile 26 and the outwardly bent free end 213 of the first part 211 of the mounting fixture 21, wherewith corresponding holes are provided in the two legs (240, 242) of the bracket 25, as appropriate for the separation distance of the two vehicle frame members (110, 111); with fastening by means of screws and/or welds. The variability of this configuration allows easy adjustment to differences in separation between the vehicle frame members (110, 111) and to manufacturing tolerances.

A more elegant solution is illustrated in FIGS. 1 and 4, wherein the mounting fixtures (20, 21) are affixed to the frame members (110, 111) of vehicle 11 by means of claw-like clamping elements (22, 23). The clamping elements (22, 23) form-interlockingly engage horizontal legs (112, 113) of the ordinary U-beams of which the vehicle frame members are comprised (or engage the U-beams via the legs). Screw means (not shown) may be employed to releasably tighten the clamping elements.

The inventive loading platform system 10 raises and lowers the loading platform 15 in a horizontal orientation, and swings it down from a vertical ("closed") to a horizontal orientation, in a manner which is per se known to one skilled in the art. Accordingly, the actuation of the system 10 and the control of the lifting cylinder mechanism 16 and closing cylinder mechanism 17 will not be described here. These mechanisms may be powered and/or controlled by hydraulic and/or electrical means.

I claim:

1. A lift-type loading platform system for mounting on a motor vehicle, said system comprising:

a lifting and closing mechanism including two supporting frames extending substantially parallel and spaced a predetermined distance apart, a loading platform for raising and lowering a load and for closing off a cargo compartment of the vehicle, a single hydraulic lifting cylinder mechanism for raising and lowering the platform, and a single hydraulic closing cylinder mechanism for swinging the loading platform back and forth between a horizontal position and vertical position, said single hydraulic closing cylinder mechanism being spaced from said single hydraulic lifting mechanism, said lifting and closing mechanism also including said lifting cylinder mechanism having force application points lying in a first plane formed by pivot points of elements of a first supporting frame of said two supporting frames, said lifting cylinder mechanism being associated with said first supporting frame and exerting forces on said first supporting frame to raise and lower the platform, and said closing cylinder mechanism including force application points lying in a second plane formed by pivot points of elements of a second supporting frame of said two supporting frames, said closing cylinder mechanism being associated with said second supporting frame and exerting forces on said second supporting frame to swing the loading platform back and forth between a horizontal position and a vertical position.

2. A lift-type loading platform systems according to claim 1, wherein said first supporting frame is comprised of two mutually parallel frame members separated by a predetermined distance, said two frame members are swingably mounted to the vehicle via first swing pivot means, and said two frame members are connected to a first end of said lifting cylinder mechanism by second swing pivot means at an opposite end of said two frame members, and a second of said lifting cylinder mechanism is pivotably connected to the vehicle by swing axis means.

3. A lift-type loading platform system according to claim 2, wherein said first supporting frame has a third frame member, a first end of said third frame member is connected to said two frame members, and a second end of said third frame member is pivotably connected to said loading platform via said second swing pivot means disposed substantially perpendicular to said two frame members.

4. A lift-type loading platform system according to claim 3, wherein said third frame member is disposed essentially in a midplane between said two frame members.

5. A lift-type loading platform system according to claim 3, wherein said third frame member has a substantially plate shape.

6. A lift-type loading platform system according to claim 2, wherein said two frame members each have a substantially plate shape.

7. A lift-type loading platform system according to claim 1, wherein said second supporting frame is comprised of two frame members which are substantially mutually parallel and are separated by a distance, said two frame members are swingably mounted at one end to the vehicle via first swing pivot means, and said two frame members are pivotably connected to the loading platform via second swing pivot means disposed on an opposite end of said two frame members and oriented substantially perpendicularly to said two frame members and parallel to said first swing pivot means.

8. A lift-type loading platform system according to claim 1, wherein a first end of said closing cylinder mechanism is pivotably connected to the vehicle and a second end of said closing cylinder mechanism is pivotably connected to the loading platform via swing pivot means extending substantially perpendicular to a longitudinal axis of said closing cylinder mechanism, said longitudinal axis is substantially disposed in said second plane in which said second supporting frame executes swinging movements.

9. A lift-type loading platform system according to claim 1, wherein a respective mounting fixture is provided for each of said first and second support frames, whereby said first and second support frames are connected to the vehicle.

10. A lift-type loading platform system according to claim 9, wherein said mounting fixture has a plate-like structure.

11. A lift-type loading platform system according to claim 9, wherein said mounting fixture has a bend line which is substantially vertical when the mounting fixture is mounted on the vehicle, said mounting fixture includes a first part extending at an angle toward the vehicle, and a second part fixed to said lifting and closing mechanism, said second part is oriented substantially parallel to the vehicle and an obtuse angle is formed between said first part and said second part.

12. A lift-type loading platform system according to claim 9, wherein said mounting fixture is fixable to the vehicle by a bracket.

13. A lift-type loading platform system according to claim 12, wherein said bracket has a plate structure.

14. A lift-type loading platform system according to claim 13, wherein said bracket has at least one first leg which projects substantially transversely with respect to the vehicle, and the mounting fixture is connected at least to a free end of said at least one first leg, in a region of a bend line of said mounting fixture.

15. A lift-type loading platform system according to claim 14, wherein said bracket has a second leg which projects substantially transversely with respect to the vehicle, a free end of said first part of said mounting fixture is bent outward with respect to said first part and is connected to said second leg of said bracket.

16. A lift-type loading platform system according to claim 9, wherein said mounting fixtures are releasably fixed to frame members of the vehicle by clamping elements which form-interlockingly engage said frame members via horizontal legs of said frame members.

17. A lift-type loading platform system according to claim 1, wherein said single hydraulic lifting cylinder lies in a plane of said first supporting frame and said single hydraulic closing cylinder lies in a plane of said second supporting frame.

* * * * *